United States Patent [19]

Albrecht et al.

[11] 4,318,798

[45] Mar. 9, 1982

[54] PROCESS OF COOLING HOT GRANULAR SOLIDS

[75] Inventors: Johannes-Josef Albrecht, Frankfurt am Main; Roland Rammler, Königstein; Martin Hirsch, Friedrichsdorf, all of Fed. Rep. of Germany

[73] Assignee: Metallgesellschaft Aktiengesellschaft, Frankfurt, Fed. Rep. of Germany

[21] Appl. No.: 181,579

[22] Filed: Aug. 25, 1980

[30] Foreign Application Priority Data

Sep. 13, 1979 [DE] Fed. Rep. of Germany ....... 2937065

[51] Int. Cl.³ .............................................. C10G 1/02
[52] U.S. Cl. .................................................. 208/11 R
[58] Field of Search ...................................... 208/11 R

[56] References Cited

U.S. PATENT DOCUMENTS

| | | | |
|---|---|---|---|
| 2,550,432 | 4/1951 | Thompson | 208/11 R |
| 3,655,518 | 4/1972 | Schmalfeld | 208/11 R |
| 3,703,442 | 11/1972 | Rammler | 208/11 R |
| 3,976,558 | 8/1976 | Hall | 208/11 R |

Primary Examiner—T. M. Tufariello
Attorney, Agent, or Firm—Sprung, Felfe, Horn, Lynch & Kramer

[57] ABSTRACT

A process of cooling hot granular solids which are at temperatures from about 400° to 1300° C., which comprises maintaining solids in an agitated or trickling state in a cooling zone, causing air to rise through the cooling zone in direct contact with the solids, and utilizing at least part of the sensible heat of the solids so dissipated.

7 Claims, 3 Drawing Figures

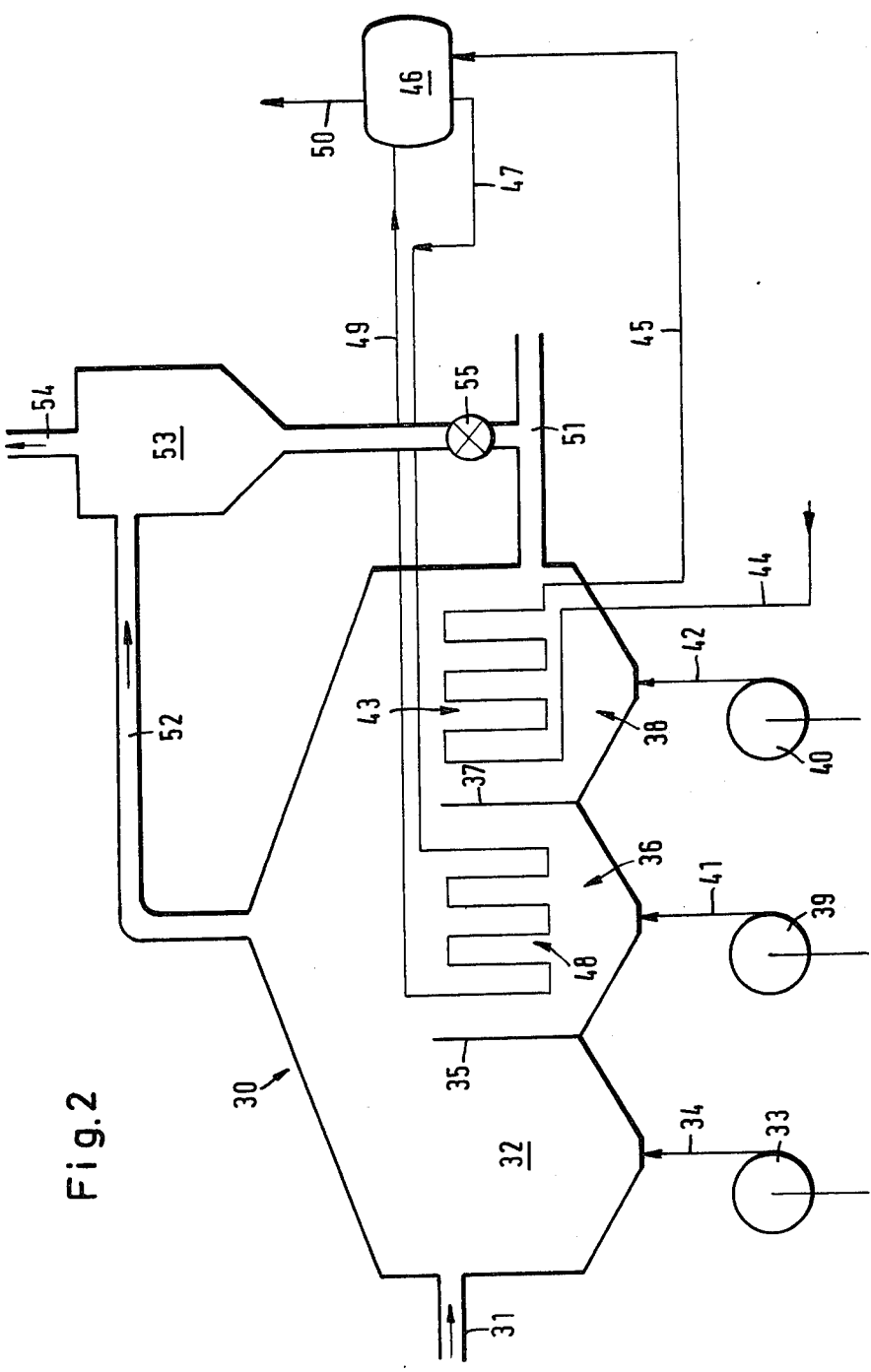

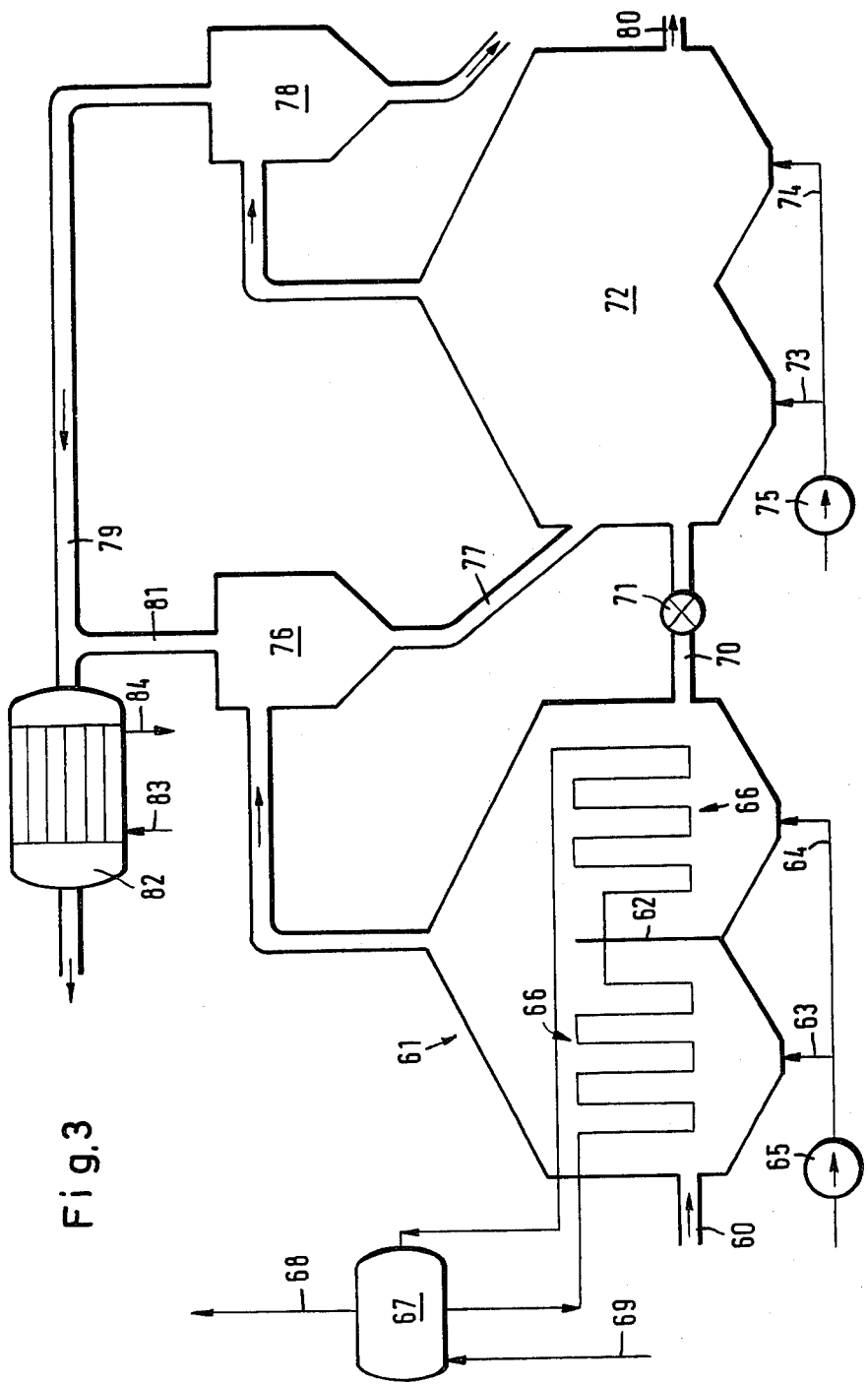

PROCESS OF COOLING HOT GRANULAR SOLIDS

This invention relates to a process of cooling hot granular solids which are at temperatures from about 400° to 1300° C. It is an object of the invention to provide an economical process of that kind and to achieve a desirable utilization of energy. This is accomplished in accordance with the invention in that the solids are maintained in an agitated or trickling state in a cooling zone, air is caused to rise through the cooling zone in direct contact with the solids, and at least part of the sensible heat of the solids is dissipated and utilized.

The solids may come from various previous processes and may have a fairly wide particle size range. To ensure that the particles can be agitated or caused to trickle, the upper particle size limit lies at about 10 to 12 mm. The solids may be agitated in fluidized-bed units of various known types, with or without a bottom having perforations for the fluidizing gas and one fluidizing chamber or a plurality of fluidizing chambers which communicate with each other. The solids may be caused to trickle downwardly in trickling towers or trickling columns, which are preferably provided with a plurality of permeable intermediate bottoms so that the flow of the solids is retarded and their residence time in the trickling zone is prolonged.

In a preferred embodiment of the invention, solids are processed which have been devolatilized by dry distillation of granular solids, such as oil sand, oil shale, oil chalk, native asphalt or oil-containing diatomaceous earth. During the dry distillation of such materials, hydrocarbon-containing vapors are released and withdrawn and hot granular residual solids are left.

The hot solids which become available, e.g., as a result of dry distillation may still contain 1 to 15% by weight of carbon. In such case that carbon is at least partly burnt by a supply of combustion air so that the solids are additionally heated. The low-carbon residual solids obtained after the combustion are then fed at temperatures of about 600° to 1300° C. into the cooling zone. Carbonaceous solids can be burnt in a combustion chamber, which may consist of a venturi combustion chamber.

If sensible heat is to be extracted from the hot granular solids in the cooling zone, this may be accomplished by air flowing through the cooling zone in direct contact with the solids. Such air can then be used as hot air in other processes, for instance in the preceding plant for dry distillation, or in the process itself as combustion air for the afterburning of the carbon in the fine-grained residue. Part of the thermal energy of the granular solids may be indirectly dissipated in the cooling zone by means of a liquid or gaseous cooling fluid. Such dissipated thermal energy can desirably be used to generate steam.

BRIEF DESCRIPTION OF DRAWINGS

Embodiments of the process will be explained with reference to the drawings, in which FIG. 2 illustrates a three-stage cooling and FIG. 3 illustrates a third process of cooling granular solids in a plurality of stages.

DESCRIPTION OF SPECIFIC EMBODIMENTS

Figure 1:
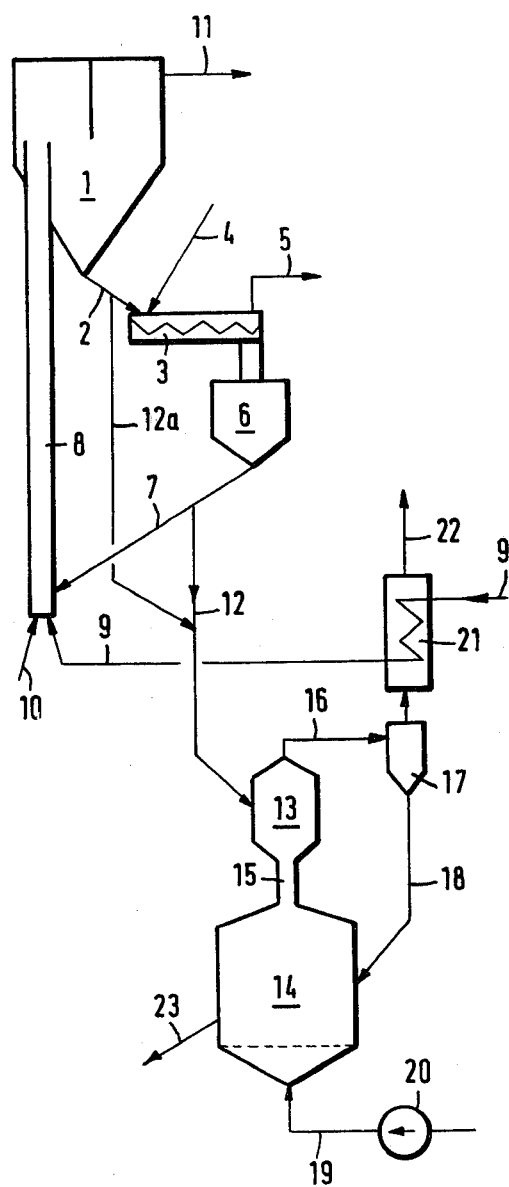
FIG. 1 illustrates a single-stage cooling of granular solids obtained by dry distillation.

The upper part of FIG. 1 is a diagrammatic representation of the dry distillation of hydrocarbon-containing materials, such as oil sand, oil shale, oil chalk, native asphalt or diatomaceous earth. That distillation has been disclosed in German Pat. Nos. 1,809,874 and 1,909,263 and the corresponding U.S. Pat. Nos. 3,655,518 and 3,703,442.

Fine-grained devolatilized residual solids at temperatures of about 500° to 900° C. are passed as a heat carrier from a collecting bin 1 through duct 2 to a mixer 3. The material to be devolatilized is fed to the mixer through duct 4. The heat carrier solids from duct 2 are intimately mixed with the material to be devolatilized. The resulting mixture has a temperature of about 400° to 800° C. Distillable hydrocarbon-containing vapors are released by pyrolysis from the material that is to be devolatilized and are withdrawn through duct 5. The gases and vapors are then subjected to further processing and for this purpose are first fed to a condensing system, not shown. Hot mixed solids from the mixer 3 fall into an intermediate bin 6, in which they may be further degasified.

Part of the devolatilized residual solids and of the heat carrier, which consists mainly of fine-grained solids, is fed through duct 7 to the lower end of a pneumatic conveyor 8, in which the solids are conveyed upwardly by means of preheated combustion air from duct 9 and mixed, if desired, with additional fuel from duct 10. The solids are heated by the combustion gases thus evolved. At its upper end, the pneumatic conveyor 8 opens into the collecting bin 1, in which the heated solids are collected for further use and exhaust gas escapes through duct 11.

Another part of the mixed hot solids from bin 6 constitutes surplus material and must be continuously withdrawn through duct 12. In dependence on the actual conditions, that surplus material may be alternatively or additionally withdrawn from the collecting bin 1 through duct 12a. The devolatilized residual solids consist not only of inert solids but usually contain also 1 to 15% by weight of carbon. The mixed solids from duct 12 and/or duct 12a are burnt in a venturi burner 13 with the aid of preheated combustion air from a fluidized-bed unit 14 through duct 23.

The exhaust gases from the cyclone 17 flow through an air heater 21 and deliver part of their heat content to the combustion air in duct 9. When the exhaust gases have thus been partly cooled, they may be used in duct 22 to generate steam, if desired, although this is not shown in FIG. 1.

The arrangement of FIG. 1 may be modified in that the fluidized-bed unit 14 is replaced by a trickling column, known per se, which as permeable intermediate bottoms. Such trickling column has been described, e.g., in U.S. Pat. No. 3,705,086, the disclosure of which is hereby incorporated herein by reference.

In the arrangement shown in FIG. 2, a multi-chamber fluidized-bed unit 30 includes a combustion zone and a cooling zone. The hot granular solids are first fed through duct 31 to the combustion zone 32. The combustion air serves also as a fluidizing gas and is fed by blower 33 through duct 34. Part of the solids flows continuously from the combustion zone 32 across a half-height weir 35 into a first cooling zone 36. The solids finally flow across another half-height weir 37 into the second cooling zone 38. Fluidizing air is fed to the two cooling zones 36 and 38 by separate blowers 39 and 40 and ducts 41 and 42.

In the region in which the solids are fluidized the second cooling zone 38 contains a cooling pipe coil 43 (or cooling boxes or similar heat exchanger devices), which is flown through by boiler feed water from conduit 44. The preheated water flows in conduit 45 to a steam header 46. The energy in the first cooling zone 36 is used to generate steam. For this purpose, preheated cooling water from the steam header 46 is passed through conduit 47 and cooling pipe coil 48 and back to the steam header 46 through the return conduit 49. Steam is withdrawn through duct 50.

The cooled solids are removed from the fluidized-bed unit 30 through the discharge duct 51. The gases exhausted from zones 32, 36 and 38 are jointly fed in a duct 52 to a dust-collecting cyclone 53 and leave the latter through the exhaust gas duct 54. Dust collected in the cyclone is passed through the lock chamber 55 to the discharge conduit 51. The gases may be fed through the exhaust gas duct 54 to additional heat exchanger, in which the sensible heat of the gases can be recovered.

Carbon contained in the solids fed to the combustion zone 32 should be intensely burned therein. For this purpose the fluidizing gas rate in that zone is selected to correspond to a velocity of about 1 to 3 meters per second in a solids-free reactor cross-section. The gas velocity is higher in that combustion zone than in the two succeeding cooling zones 36 and 38. In a modification of the arrangement of FIG. 2, fluidizing gas may be supplied to both cooling zones 36 and 38 by a common blower. The fluidizing gas rate in both cooling zones is controlled to correspond approximately to the same velocity of about 1 to 2 meters per second in a solids-free reactor cross-section. The arrangement of FIG. 2 permits a more intense dissipation of heat from the solids. In that arrangement, the temperature of the solids in the discharge duct 51 may be as low as 200° to 400° C. if the temperature in the combustion zone 32 is about 600° to 1000° C. In that case the exhaust gas temperature in duct 52 is between about 300° and 500° C.

Another feature of the invention resides in that individual cooling means in the chamber of a fluidized-bed unit can be rendered operative and inoperative in dependence on operating conditions. For instance, it will be desirable in an arrangement as shown in FIG. 2 to disconnect part of the hearing surface of the cooling pipe coil 48 if the residue to be processed has a very high carbon content, which cannot be completely burned in chamber 32. In that case the chamber 36 is required for afterburning and the temperature in said chamber 36 would drop to excessively low values if the cooling pipe coils were fully operated.

In the arrangement shown in FIG. 3, the hot solids to be created are first fed through duct 60 to a fluidized-bed unit 61, in which two chambers are defined by the half-height weir 62. In both chambers the solids are fluidized by fluidizing air, which is supplied from below through ducts 63 and 64 and the blower 65. In the fluidized-bed unit, the compustible content of the fed solids if substantially burned. As has been explained with reference to FIG. 2, the solids in the fluidized-bed unit 61 can flow from the left-hand chambers across the weir 62 to the right-hand chamber. A cooling pipe coil 66 extends through both chambers of the fluidized-bed unit 61 and feeds water from the steam header 67 and returns a water-steam mixture to the header 67. The steam is withdrawn through conduit 68 and can be used for other purposes. Feed water is fed in conduit 69 to the steam header.

In the arrangement shown in FIG. 3, a major portion of the energy content of the solids to be processed is withdrawn in the fluidized-bed unit 61. When the solids have been burnt and partly cooled, they are passed through a transfer duct 70 and a lock chamber 71 to another fluidized-bed unit 72, which is free from internal fixtures and is supplied with fluidizing air from the blower 75 through ducts 73 and 74. The exhaust gas from the fluidized-bed unit 61 is passed through a cyclone separator 76. The separated solids are fed through duct 77 also to the second fluidized-bed unit 72, in which additional heat is extracted from the solids by the fluidizing air although a combustion need no longer be expected here. The exhaust air flows through a second cyclone separator 78 into a collecting manifold 79.

The cooled solids leave the fluidized-bed unit 72 through the duct 80 and the solids from cyclone 78 are carried off by means not shown. The exhaust gas from cyclone 76 is fed through duct 81 and admixed to the exhaust air flowing in duct 79, which is fed with exhaust gas from cyclone 78. The mixed gases are passed through the air heater 82, in which air from duct 83 is heated by an indirect heat exchange. The thus heated air is available in duct 84 as process air, e.g., for use in a dry distillation plant. For this purpose the duct 84 may be connected to duct 9 in FIG. 1. Alternatively, part of that process air may be fed as preheated combustion air through ducts 63 and 64 to the fluidized-bed unit 61.

The arrangement of FIG. 3 can easily be modified in that the relatively hot exhaust gases from the cyclone 76 are kept separate from the colder exhaust air and are supplied in duct 79 to a waste-heat recovery unit, such as an air heater.

EXAMPLE 1

In an arrangement as shown in FIG. 1 but without the duct 12a, residual solids which had been obtained by the devolatilization of oil shale and had particle sizes below 1 mm and a carbon content of 5% by weight were withdrawn through duct 12 at a rate of 30 metric tons per hour. At an inlet temperature of 800° C., these solids entered the venturi burner 13, in which the carbon was burned to a residual content of about 1% by weight. The solids were cooled to 400° C. in the fluidizing chamber 14 and were withdrawn through duct 23. The air supplied from the duct 19 flowed through the fluidized bed at a rate corresponding to a velocity of 0.8 meters per second in a solids-free fluidized-bed unit. The fluidized air flowed at a temperature of about 400° C. through the transfer duct 15 into the burner 13. Air-containing flue gas flowed in duct 16 at a temperature of about 1000° C. and then through the cyclone 17 into the air heater 21. As the cooled flue gas in duct 22 had still a temperature of about 500° C., it could be used further, e.g., to generate steam.

The total heat rate at which heat was recovered from the solids, inclusive of the combustion in burner 13, amounted to $5.5 \times 10^7$ kJ/h.

EXAMPLE 2

In an arrangement as shown in FIG. 2, fine-grained solids having a particle diameter below 4 mm and containing 1% by weight carbon were fed to the fluidized-bed unit 30 at an inlet temperature of 1000° C. and at a rate of 800 metric tons per hour. Residual carbon was burnt virtually only in the first fluidizing chamber, which contained the combustion zone 32. The fluidizing air was passed through said zone at a rate corresponding to a gas velocity of 2 meters per second. That gas velocity as well as the subsequently indicated velocity of the fluidizing gas are stated for a solids-free reactor cross-section. The fluidizing air rate in the first cooling zone 36 and also in the second cooling zone corresponded to a gas velocity of 1.5 meters per second. The air-containing exhaust gas leaving the fluidized-bed unit 30 through duct 52 was at 300° C. The solids in the discharge conduit 51 are at a temperature of 120° C.

Heat of combustion and solids enthalpy were dissipated at a total rate of about $10^9$ kJ/h. About 60% of that energy were delivered to the water that flows through cooling pipe coils 43 and 48 and were used to generate steam.

EXAMPLE 3

In an arrangement as shown in FIG. 3, fine-grained solids having a particle size up to 8 mm, a carbon content of 15% by weight and a temperature of 600° C. were fed at a rate of 500 metric tons per hour through duct 60 to the two-chamber fluidized-bed uit 61. The fluidizing gas was fed through the fluidized-bed unit at a rate corresponding to a gas velocity of 2 meters per second. The carbon was burned to a residual content of 1% by weight. The solids were then cooled in the fluidized-bed unit 72, which was supplied with gas at a rate corresponding to a gas velocity of 3 meters per second. Cooled solids at a temperature of 350° C. were withdrawn through duct 80.

Energy was dissipated at a total rate of $2.5 \times 10^9$ kJ/h. About 95% of said energy were released as combustion heat in the fluidized-bed unit 61. About 30% of the heat which is dissipated are used to generate steam in the cooling pipe coils 66. The remaining heat contained in the combined exhaust gases from the fluidized-bed units 61 and 72 was used to preheat process air in the air heater 82 and to generate steam in a waste-heat boiler, not shown.

What is claimed:

1. A process of cooling hot granular solids which have been made available by the dry distillation of oil sand, oil shale, oil chalk, diatomaceous earth or native asphalt as fresh material, said distillation comprising mixing said fresh material with devolatilized reheated residual solids of a temperature in the range of 500° to 900° C. from a collecting zone, devolatilizing said fresh material and creating a mixture of residual solids, a first partial stream of said mixture of residual solids being fed to the lower end of a vertical pneumatic conveyor line together with preheated combustion air, by combustion gases reheating said residual solids in the conveyor line and conveying them upwardly into said collecting zone, granular solids selected from the group composed of a second partial stream of said mixture of granular solids or a partial steam or reheated solids from the collecting zone or a mixture of both streams, these granular solids having a carbon content of 1 to 15 percent by weight, being fed into a combustion zone, said carbon content being at least partly burned therein by a supply of combustion air and said granular solids in said combustion zone are heated to a temperature in the range of about 600° to 1300° C., feeding said granular solids heated in said combustion zone to a cooling zone, in said cooling zone, maintaining said granular solids in an agitated or trickling state and causing air to rise through said cooling zone in direct contact with the granular solids, utilizing at least part of the sensible heat of the granular solids dissipated in the combustion zone or cooling zone for preheating the combustion air fed into the pneumatic conveyor line, the cooling zone being constituted by a multi-chambered fluidized bed zone or a trickling zone.

2. A process according to claim 1, wherein said combustion chamber comprises a venturi combustion chamber.

3. A process according to claim 1, wherein part of the thermal energy of the granular solids is indirectly dissipated in the cooling zone by means of a liquid or gaseous cooling fluid.

4. A process according to claim 1, wherein the hot burnt residue is cooled in one or more fluidized beds or in a trickling zone in direct contact with air, which is subsequently used as process air.

5. A process according to claim 4, wherein the preheated air is used as process air for dry distillation.

6. A process according to claim 3, wherein the cooling means can be shut off so that at least part of the cooling zone can be used as a combustion zone.

7. In a process for the dry distillation of oil containing solids of the group consisting of oil sand, oil shale, oil chalk, diatomaceous earth or native asphalt wherein said solids are heated in a vertical pneumatic conveyor and devolatilized in a devolatization zone, the vertical pneumatic conveyor is fed with heated combustion air, the improvement wherein the so devolatilized solids are at least in part fed to a venturi combustion chamber and burned therein and thereafter are contacted in an agitated or trickling state while at a temperature of 400° to 1300° C. with rising air and the sensible heat from the air which has passed through said solids is conveyed to the heated combustion air which is fed to said vertical pneumatic conveyor.

* * * * *